US007069158B2

United States Patent
Gidwani (10) Patent No.: US 7,069,158 B2
(45) Date of Patent: Jun. 27, 2006

(54) SYSTEM AND METHOD FOR ANALYZING STRUCTURES SUBJECTED TO CATASTROPHIC EVENTS

(75) Inventor: Jawahar M. Gidwani, San Francisco, CA (US)

(73) Assignee: Karma2go. com, LLC, San Francisco, CA (US)

( * ) Notice: Subject to any disclaimer, the term of this patent is extended or adjusted under 35 U.S.C. 154(b) by 525 days.

(21) Appl. No.: 09/759,962

(22) Filed: Jan. 12, 2001

(65) Prior Publication Data

US 2001/0029432 A1    Oct. 11, 2001

Related U.S. Application Data

(60) Provisional application No. 60/175,761, filed on Jan. 12, 2000.

(51) Int. Cl.
*G01F 17/00* (2006.01)
(52) U.S. Cl. ............... 702/56; 702/15; 73/862.321; 73/862.471; 73/862.621; 52/167.7; 52/167.34
(58) Field of Classification Search .......... 52/167.7, 52/167.4; 73/862.321, 862.471, 862.621; 702/56, 15; 700/30
See application file for complete search history.

(56) References Cited

U.S. PATENT DOCUMENTS

| 4,964,060 | A | * | 10/1990 | Hartsog ..................... 703/1 |
| 5,163,015 | A |   | 11/1992 | Yokota |
| 5,388,056 | A | * | 2/1995  | Horiuchi et al. ........... 702/56 |
| 5,675,088 | A |   | 10/1997 | Serata |
| 5,842,148 | A | * | 11/1998 | Prendergast et al. ....... 702/34 |
| 5,983,010 | A | * | 11/1999 | Murdock et al. ............ 703/6 |
| 6,044,210 | A |   | 3/2000  | Nagtegaal |
| 6,117,178 | A | * | 9/2000  | Whitney et al. ............ 703/12 |
| 6,412,237 | B1| * | 7/2002  | Sahai ...................... 52/167.1 |

OTHER PUBLICATIONS

D'Ambrisi, A. et al. "Modeling of Cyclic Shear Behavior in RC members" Oct. 1999, Journal of structural engineering, pp. 1143-1150.*

* cited by examiner

*Primary Examiner*—Anthony Knight
*Assistant Examiner*—Thomas Pham
(74) *Attorney, Agent, or Firm*—Baker & McKenzie LLP (57) ABSTRACT

A computer-implemented system and method for analyzing a structure subjected to a catastrophic event. Based on linear elastic input data, the system automatically determines nonlinear hysteretic behaviors. The nonlinear models are then analyzed through any one of a number of nonlinear analysis techniques. Processing load of a computer is substantially reduced through various mathematical functions.

16 Claims, 9 Drawing Sheets

TABLE 1. TYPICAL SUMMARY REPORT

ANALYSIS SUMMARY
================

********** THE FOLLOWING MEMBERS HAVE EXPERIENCED INELASTIC BEHAVIOR ******************

NUMBER OF INELASTIC MEMBERS = 4

| EVENT --- STATIC--- | | LOAD | ELEM | ELEM | GROUP | NODE | NODE | D/C RATIO | ------MAXIMUM DUCTILITIES------ | | | GROUP TITLE |
|---|---|---|---|---|---|---|---|---|---|---|---|---|
| SEUNCE | INCRMN | STEP | STEP | NAME | TYPE | NUMBR | I | J | | AXL TOTAL | AXL COMP. | AXL TENS. BND DUCTL | |
| 1 | 1 | 0 | 602 | LX1 | ISTR | 3 | 4 | 8 | 0.000 | 15.354 | 6.780 | 8.574 0.000 | POST-BUC |
| 1 | 1 | 0 | 602 | LX2 | ISTR | 3 | 7 | 5 | 0.000 | 15.229 | 8.417 | 6.812 0.000 | POST-BUC |
| 2 | 2 | 0 | 628 | LX3 | NTRS | 4 | 7 | 11 | 0.000 | 4.354 | 1.624 | 2.729 0.000 | POST-YIE |
| 2 | 2 | 0 | 628 | LX4 | NTRS | 4 | 10 | 8 | 0.000 | 4.312 | 2.700 | 1.612 0.000 | POST-YIE |

SYSTEM AND METHOD FOR ANALYZING STRUCTURES SUBJECTED TO CATASTROPHIC EVENTS

CROSS-REFERENCE TO RELATED APPLICATIONS

This application claims the benefit of provisional U.S. Patent Provisional Application No. 60/175,761, entitled INTERNET-BASED DAMAGE PERFORMANCE EVALUATION, RISK ASSESSMENT AND MITIGATION OF SYSTEMS SUBJECTED TO CATASTROPHIC NATURAL DISASTERS AND MAN-MADE DISASTERS, filed Jan. 12, 2000.

FIELD OF THE INVENTION

The present invention relates to structure analysis systems, and in particular to a system for analyzing structures subjected to catastrophic events such as earthquakes, hurricanes, tornadoes, and man-made hazards.

BACKGROUND OF THE INVENTION

Recent earthquakes in California (1989 Loma Prieta, 1994 Northridge), Japan (1995 Kobe), Turkey (1999), and Taiwan (1999) have clearly identified the vulnerability of structures to earthquakes and the staggering monetary losses due to such events. Losses from the Northridge earthquake alone are estimated at $15 billion. Kobe earthquake losses are estimated at hundreds of billions of dollars.

The West Coast of the U.S. and the Pacific Northwest States are all susceptible to earthquakes. Discovery of the New Madrid fault poses a great danger to the Midwest region of the U.S.

The Eastern Coast of the U.S. from Florida to Rhode Island is also susceptible to hurricanes. The hurricane season typically lasts from June through November each year. On an average, 12 to 14 hurricanes are generated in the Gulf each year. Losses from these hurricanes are also estimated at hundreds of billions of dollars. Losses from hurricane Andrew alone are estimated at $25 billion.

Although all structures built in these regions are designed according to the national, regional and local building codes, there are catastrophic destructions and failures in these events. To understand why, the building codes need to be analyzed.

Building seismic design forces are customarily provided by the Uniform Building Code (UBC). The UBC is updated from time to time with 1997 UBC being the current version in effect. The UBC states "The purpose of the earthquake provisions herein is primarily to safeguard against major structural failures and loss of life, not to limit damage or maintain function." The Structural Engineers Association of California (SEAOC) 1996 commentary adds the following to the UBC statement: " . . . or provide for easy repair."

The basic design procedure recommended by the Code assumes that the structure will undergo inelastic behavior and will sustain damage, i.e., may be permanently deformed or broken, during a design level earthquake. This is implied by the use of the R-factor in the 1997 UBC, (i.e., "numerical coefficient representative of the inherent overstrength and global ductility capacity of lateral-force-resisting systems") to reduce the design lateral forces on a structure. A typical design procedure is as follows: 1. selection of a design level earthquake intensity; 2. reduction of the applied forces (e.g., base shear) computed from the design earthquake by a Code recommended R-factor; and 3. design of the structure (using the current practice of linear elastic analyses) for these reduced force levels to ensure elastic response such that the structure assumes its original shape after loading.

For different structure types the maximum R-factors are recommended in the Code. However, the selection of an appropriate factor for the structure under consideration, up to the maximum allowable Code value, is left to the discretion of the designer. Selection of the R-factor is usually determined by the performance criteria the owner wishes to establish. Thus, if the owner wishes the structure to be undamaged for the design level earthquake forces, the designer would select a value of R equal to 1.0. This decision, however, would result in a considerable increase in the cost of the structure and, given the random nature of the earthquake occurrence, this choice is not usually considered to be cost-effective.

A value of the reduction factor, R, greater than approximately 1.5 implies that the system will undergo inelastic behavior and will be damaged if a ground motion of design intensity is observed at the site. The coefficient of 1.5 represents the average factor, which is used in design to either factor the loads in load factor design or factor the yield strength of materials in working stress design. The R-factor is intended to refer to an acceptable level of damage via a global ductility response measure.

Thus, for a working stress design, if a R-factor of 10 is used in the design, the structure is assumed to sustain a global ductility of up to approximately 10/1.5=6.7. Global ductility is a measure of damage. Typically for a building subjected to earthquake motions, it is defined as the ratio of the maximum building roof displacement and the roof displacement at which the first significant damage occurs anywhere in the building. Such assumed ductilities used in design can only be confirmed by a nonlinear analysis (or experimental testing).

It has been widely published in literature that the methodology called "nonlinear analyses, nonlinear dynamics or failure dynamics" utilized in computer programs is the only realistic way to assess damage due to catastrophic events. Over the past 25 years, numerous reports from reputable Universities like U.C. Berkeley, Stanford and others have clearly stated these findings. The oil industry realized the value of such methodology and has incorporated it as a requirement in the API RP 2A Design Code. All offshore structures designed and built in the U.S. must comply with this Code.

Unlike the oil industry's design code, however, the building codes do not require such a state-of-the-art nonlinear analysis to confirm that the assumed global ductilities can be achieved in the adopted design. There are three primary reasons for not enforcing such a requirement in the building codes. First, non-linear analysis is too complex and too expensive to develop and validate for a wide variety of applications. It is important to note that the computational intensity of these algorithms have historically required Cyber mainframe class of computers available through places such as the Lawrence Livermore Laboratory. Second, it requires extensive manual intervention of an engineer with specialized training and theoretical background to set-up input models for a given structure. Third, because typical outputs from these analyses are voluminous, results interpretation is time consuming and requires specialized engineering knowledge.

SUMMARY OF THE INVENTION

According to the principles of the present invention, a computer-implemented system and method for analyzing a structure subjected to a catastrophic event are provided. Based on linear elastic input data, the system automatically determines non-linear hysteretic behaviors without extensive manual intervention. The nonlinear models are then analyzed through any one of a number of nonlinear analysis techniques. Processing load of a computer is substantially reduced through various mathematical techniques which allow an ordinary server or workstation computer to conduct the analysis without requiring the power of a mainframe or super computer.

DETAILED DESCRIPTION OF THE INVENTION

Figure 1:
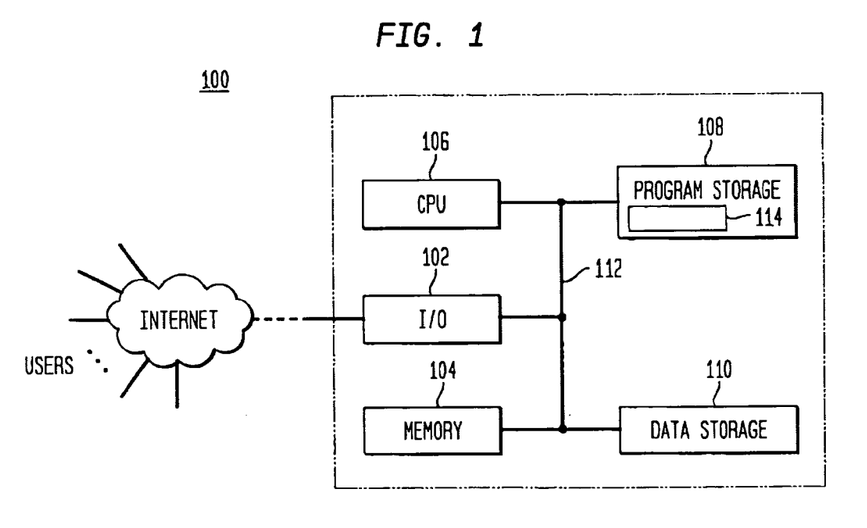
FIG. 1 is a functional block diagram of a system for analyzing structures according to an exemplary embodiment of the present invention.

As illustrated in FIG. 1, a structure analysis program 114 is maintained in an exemplary computer system 100, such as a WINDOWS-based or UNIX-based personal computer, server, workstation or a mainframe. The system 100 is connected to the Internet through, for example, an I/O interface 102, such as for a LAN, WAN, fiber optic or cable link, which receives information from and sends information to Internet users. While the system 100 is shown as a one computer unit for purposes of clarity, persons of ordinary skill in the art will appreciate that the system may comprise a group of servers depending on the load and database size.

The system 100 includes, for example, memory storage 104, processor (CPU) 106, program storage 108, and data storage 110, all commonly connected to each other through a bus 112. The program storage 108 stores, among others, a structure analysis program 114 containing all or portions of the routines 150, 200 and 300. The data storage 110 stores such data as physical properties of various members of structures, mathematical representations of algorithms, damage functions database and the like. Any of the program modules in the program storage 108 and data from the data storage 110 are transferred to the memory 104 as needed and is executed by the processor 106.

The structure analysis system 100 of the present invention includes simplified input data to the computer programs used in the industry on large-scale projects. Seismic retrofit of the Golden Gate Bridge is one example of a large-scale project. The present invention simplifies input data to an extent that the input data structure mimics the typical linear elastic analyses data structure.

Typically, for a linear elastic analysis of a structure, structure data input (linear elastic input data) includes the geometry data for each element or member in the structure. As an example, for a steel building, the linear elastic input data would define the geometry of columns and beams in terms of their section sizes, i.e., W12×24, etc. This data is sufficient to calculate the stiffness and mass of the member. Given the spatial distribution of members within a building, the total structure stiffness and mass can be calculated.

For nonlinear dynamic time history analyses, complex nonlinear hysteretic behavior of members needs to be specified. The member behavior may be different even though the geometry section may be the same. For example, a W12×24 section 3 feet long has dramatically different nonlinear hysteretic behavior than a similar member that is 15 feet long. Hence, input data for nonlinear analyses becomes very complex and often requires an engineering consultant with special knowledge in structure analysis.

The present invention overcomes this problem by having the user define the member inputs for the linear elastic model, i.e., element geometry is defined via section size specification. Additional linear input data required are the material type, and its yield stress to calculate overstress ratios. With the linear elastic input data, the program automatically calculates the complex hysteretic behavior internally.

The engineering community is familiar with "linear elastic" input data structures. In addition, translators and filters are available which further simplify the creation of input data. Moreover, according the principles of the present invention, new efficient solution techniques allow nonlinear analysis to be conducted by ordinary desktop workstations.

For example, nonlinear dynamic time history analyses require numerical solution of a large system of equations during each step of integration. For an earthquake time history analyses, the number of steps may vary from 1000 to 5000. For wave, wind and other natural forces, the number of steps may vary from a few hundred to a few thousand. Furthermore, within each time step, more solutions may be needed to achieve equilibrium, i.e., several iterations within a time step. The iterations may be due to element nonlinear behavior or large displacement effects or both. In contrast, linear analyses require such solution once only in dynamic analyses. Thus, if traditional numerical methods are utilized, they require tremendous computing power. The present invention overcomes this problem by developing numerical schemes and methods to substantially reduce computation time required in solving the system of equations.

Once analyzed, the results are conveniently summarized in tabular and graphical form. The user also receives a color-coded picture of the structure in which damaged areas with varying damage levels are shown. A 3-D photo-realistic movie showing real-time dynamic responses may also be generated.

The structure analysis program 114 of the present invention is accessible through a network such as the Internet and is billed to a user on a pay-per-use basis. Thus, the user has no capital costs for hardware/software and pay-per-use is a convenient economical option for project expenses.

In another embodiment, the program 114 provides an engineering based structure rating system which identifies the potential risk due to catastrophic events for use by, for example, the financial institutions, engineering communities and insurance companies, corporate and other institutions to assess and manage their risks. Structures can be of any material and type (e.g., residential, non-residential, transportation infra-structure, etc.).

Figure 2:
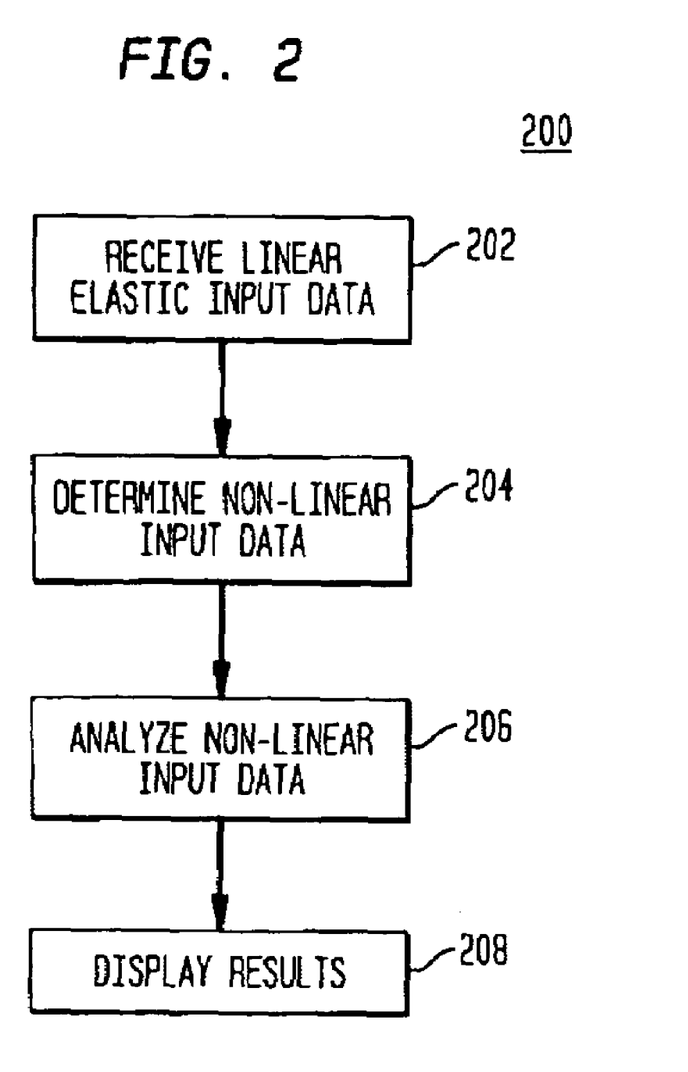
FIG. 2 is a flow diagram of a method of performing a nonlinear analysis.

FIG. 2 illustrates a nonlinear analysis routine 200 which is a part of the structure analysis program 114. Non-linear analysis types include, but are not limited to, time history analysis, static pushover, modal analyses, and fatigue analysis.

In step 202, linear elastic input data is received by the system 100. Typically, the linear elastic input data for analyses includes: (a) geometry (nodal coordinates, boundary conditions, nodal masses, etc); (b) member connectivity/ properties (section properties, material properties, etc); (c) load data (earthquake, wind, waves, currents, etc.).

The input data may be provided as an ASCII data file conforming to the software's input specifications, or it could be generated interactively through a graphical user interface of the present invention. One could also provide a scanned structure layout (e.g., layout from a property assessment report) and use this layout in conjunction with the graphical user interface to identify locations of structural elements and generate an ASCII data file. Alternatively, filters in the present invention can be used to convert data from a suite of existing programs used in the industry to generate an ASCII data file that conforms to the present invention's software input specifications.

The linear input data to be received in step 202 includes global definitions of material properties, section properties for stiffness calculations, section properties for Building Codes and Other Code checks, wave properties, miscellaneous data, group properties, eccentricities and local fixed end forces. Access to AISC and other standard rolled sections is achieved in the global section library.

For linear elastic analyses, these items are sufficient to perform the analysis. For nonlinear analyses, however, item (b) above requires a much more extensive definition of member data in terms of complex nonlinear hysteretic member behavior.

Typically, nonlinear hysteretic member behavior (nonlinear input data) comprises a definition of three components: (a) envelope behavior or curve; (b) cyclic degradation/deterioration in strength and stiffness (or simply degradation behavior); and (c) failure behavior. These components may be defined from databases and or lookup tables created from experimental observations, analytical formulae, empirical formulae, and/or any combination of the above. Interpolation and/or extrapolation formulae may be used wherever appropriate. In the present invention, all of the above methods are used wherever appropriate.

One of the more difficult tasks in any nonlinear analysis procedure is the selection of the appropriate element type to model a member in the structure. Once an element type is selected, the corresponding material, section and element properties are required to adequately define the physical behavior of that member. Selection of such properties can be tedious and requires considerable experience.

In step 204 of FIG. 2, complex member hysteretic behaviors are automatically generated. Specifically, step 204 automatically generates the nonlinear physical properties for various element types used to model tubular members, general AISC and other standard rolled sections, built-up sections, general sections, and user-defined sections. Materials may be steel, concrete, masonary, reinforced concrete, or user defined materials. Element types can be grouped as beam-column type, truss-type, foundation-type, and general/ special type.

Figure 3:
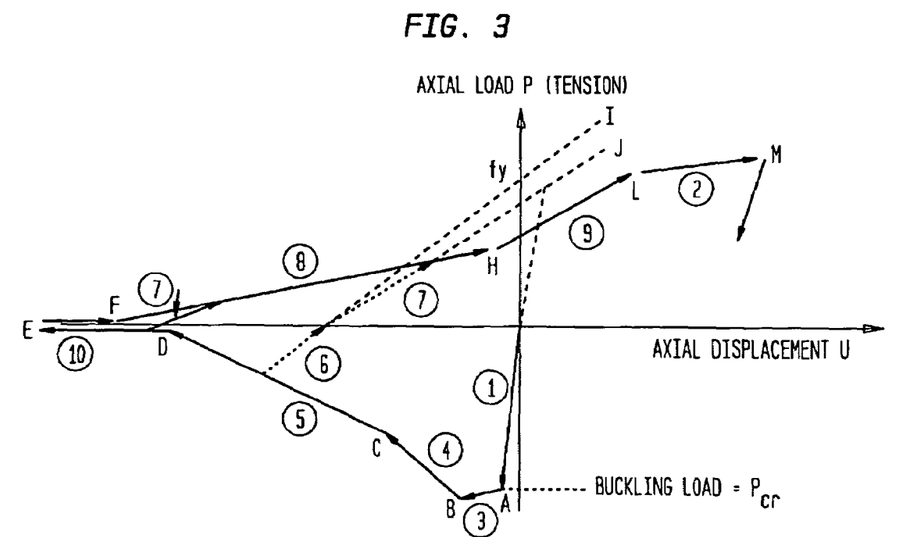
FIG. 3 is a graph of an exemplary cyclic degradation/deterioration in strength and stiffness of a truss-type post-buckling type element.

Thus if a truss-type post-buckling type element is selected to model tubular braces of an offshore structure, the user needs to specify only the member name, its connectivity, its diameter and thickness, its yield stress and the effective length factor as part of inputting the linear elastic input data in step 202. Step 204 of the routine 200 automatically generates the nonlinear envelope curve needed to define the member's physical behavior and selects an appropriate stiffness and strength deterioration algorithm for cyclic loads as shown in FIG. 3. The algorithms for generation of these properties have been derived and compiled from an extensive experimental database.

Figure 4:
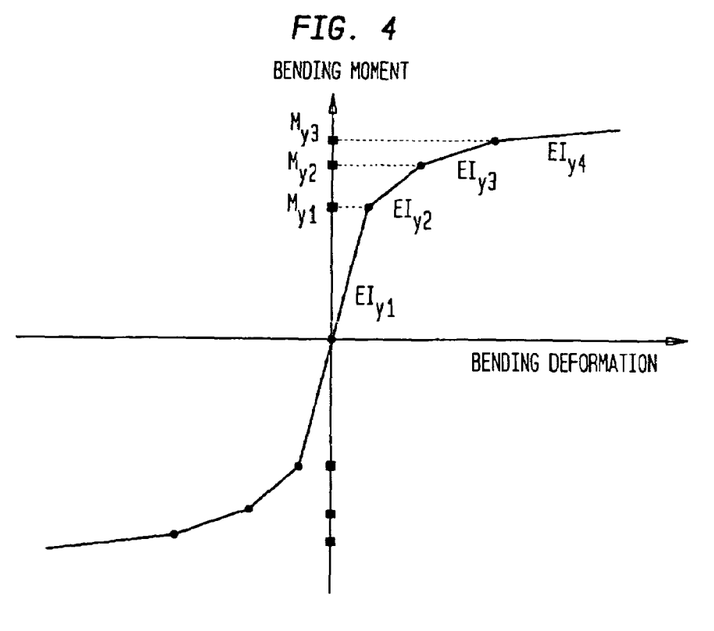
FIG. 4 is a graph of an exemplary envelope curve of a beam-column element.

Similarly, if the 3-D nonlinear large displacement beam-column element with distributed plasticity was used to model a W-section representing a column of a building, then the user specifies this section in the global library. The nonlinear properties of the beam-column element are automatically calculated based on the W-section properties, the member connectivity and user defined yield material properties, the effective length factor as shown in FIG. 4. As an example, the in-plane and out-of-plane bending envelope quadralinear curves are generated according to the following equations:

$$EIy1 = E*Iy \quad (1)$$

$$EIy2 = FAC1*EIy1 \quad (2)$$

$$EIy3 = FAC2*EIy2 \quad (3)$$

$$EIy4 = FAC3*EIy3 \quad (4)$$

Where
E=Modulus of Elasticity
Iy=In-Plane moment of inertia
FAC1, FAC2, FAC3 are factors.

These factors are calculated based on the member's kl/r ratios and compactness, or experimental data or other sources. For example, for a tubular column, FAC1 may be 0.428, FAC2=0.048/FAC1 and FAC3=0.001.

$$My1 = FAC4*Pm \quad (5)$$

$$My2 = FAC5*Pm \quad (6)$$

$$My3 = FAC6*Pm \quad (7)$$

Where
My1, My2, My3 are yield bending moments
Pm=Plastic moment based on yield stress and geometric properties and
FAC4, FAC5, FAC6 are factors.

These factors are calculated based on the member's kl/r ratios and compactness, or experimental data or other sources. For example, for a tubular column, FAC4 may be $\pi/4$, FAC5=0.92 and FAC6=0.98.

Note that similar calculations are performed for out-of-plane bending. Torsion behavior is assumed linear while the axial behavior may be calculated using the Load Factor Resistant Design (LRFD Buckling equation) or any other appropriate equation or experimental data.

Interaction amongst the two bending, one torsion and axial behavior is considered by a four-dimensional yield surface.

Figure 5:
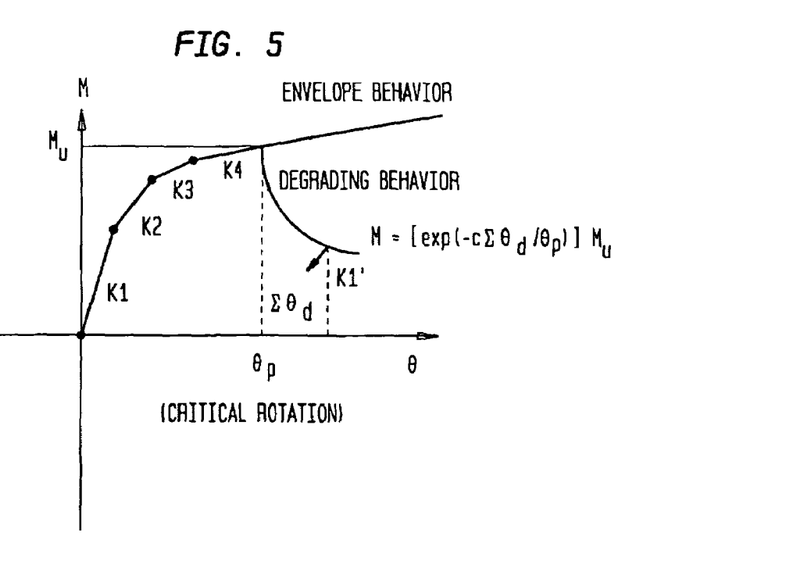
FIG. 5 is a graph of an exemplary failure behavior of a beam-column element.

The failure behavior (third type of the non-linear input data) for the beam-column element may be defined in terms of critical cumulative rotational ductility and critical cumulative axial ductility. In the example shown in FIG. 5, when the critical cumulative resultant rotational ductility from the in-plane and out-of-plane bending exceeds a threshold value, member failure is initiated. The subsequent failure behavior is characterized by the equation shown in FIG. 5.

Figure 6:
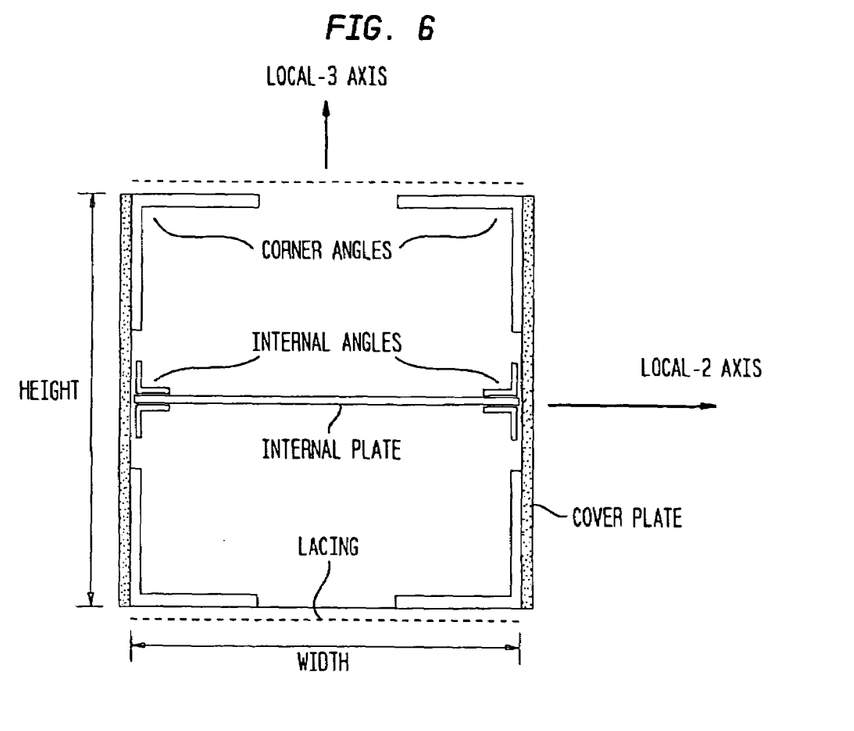
FIG. 6 is a diagram of an exemplary built-up section.

Bridges, especially older steel bridges such as the Golden Gate Bridge of San Francisco, Calif., comprise built-up sections. The present invention can handle almost any kind of a steel bridge built-up section. For a typical section shown in FIG. 6 comprising external and internal plates, external and internal angles, and lacing, the user specifies the information shown in the figure. Based on concepts similar to the beam-column described above, the present invention automatically calculates the nonlinear hysteretic bending and axial behavior.

For a masonry infill wall, the user needs to specify the panel's geometry (panel width, height, thickness), yield stress (to calculate overstress factors) and modulus of elasticity as part of the linear elastic data input. The panel hysteretic behavior is automatically defined as two diagonal struts. The strut properties are based on experimental and analytical data. Similar procedure defines properties of shear wall elements.

For reinforced concrete elements, the user specifies the concrete geometry and steel reinforcement geometry and layout as part of the linear elastic data input. Material properties for steel and concrete are input as stress-strain relations. Based on classical plasticity theory and other iterative numerical procedures, the bending and axial non-linear envelope behavior for a beam-column element type are automatically calculated. Cyclic degradation in strength and stiffness need only be defined by the user as light, moderate, and heavy. These are automatically translated to appropriate factors obtained from experimental and analytical data.

Foundation comprises the foundation elements and soil. For high-rise buildings in soft soil, the foundation elements may be piles driven in soil to appropriate depths. They may be steel, wood or concrete piles. The soil type characterizes soil elements. Here the soil may be specified by its type (e.g., clay, sand, sand etc.) and its other basic properties readily available from literature or specific soil boring laboratory tests. At the user-specified depths in the soil, the soil layer at the depth is modeled with three-orthogonal truss-type elements: two lateral and one axial. The nonlinear hysteretic behavior of each of these truss-type elements is automatically generated. In its present form, a coupled structure-foundation nonlinear analyses can be performed.

Loads may be static and/or dynamic. For static loads pushover analysis, the present invention in step 204 automatically generates static load pushover profiles for earthquake loads and wave/wind/current loads in addition to the nonlinear hysteretic member behaviors.

For earthquake loads, the user inputs the design response spectra for the three orthogonal directions with appropriate scale factors. Step 204 then automatically generates a static pushover profile by performing the eigen solution, combining the modal forces from modes capturing up to at least 90% of the mass, and correcting the pushover profile to match the story shears and overturning moments.

For wave loads, the wave/current/wind is passed through the mathematical model and the snap-shot profile defining the largest base shear in the time history is selected as the load profile. The analysis is performed automatically where only the load analysis is performed without the accompanying structural response calculations. Input for these loads is minimal and standard.

Once all nonlinear data have been determined in step 204, analysis of the structure based on the derived non-linear input data is performed in step 206. As discussed previously, for nonlinear dynamic time history analyses, the system of equations needs to be solved at every time step where there is a change of state in any member. If large displacement effects are included in the analysis, it may be necessary to solve the system of equations more frequently. Solving the system of equations here implies reformation and reduction of the global stiffness matrix. Moreover, within the time step, iterative procedures must be utilized to achieve equilibrium before proceeding to the next step. To minimize computation time the present invention optimizes the solution by (a) minimizing storage of the stiffness matrix utilizing minimization procedures such as bandwidth minimization, profile frontal method, etc.; (b) utilizing numerical solution methods that require only one copy of the stiffness matrix; (c) utilizing storage and solution schemes where only the portion of stiffness matrix that has changed due to change in member state and/or large displacement effects is reformulated and reduced; (d) utilizing higher order numerical integration schemes which allow increase in step size and hence reduction in the total steps required for analysis; and (e) utilizing hardware specific available accelerations. These novel features allow a drastic reduction in computational power necessary to conduct the non-linear analysis of structures.

For a static analysis, additional analysis automation is provided by a self-sensing static analysis capability. It allows users to perform ultimate capacity analyses accurately in a minimum amount of time. It has been established that the automatic (self-sensing) load stepping procedure is less sensitive to the analysis approach used than the manual load stepping procedure.

The addition of a self-sensing (automatic) dynamic option allows the step size to be varied during a dynamic analysis. This option results in considerable savings in computational and engineering costs. The criterion for time step control is based on severity of nonlinear response in any given time step. The unbalanced force vector at the end of the time step defines the severity of nonlinear behavior. If the Euclidean norm of this unbalanced force vector exceeds a user specified tolerance, the step size is reduced by the user specified factor (commonly 0.5), and the step is repeated. Alternately, if the Euclidean norm of this unbalanced force vector is below the specified tolerance, the subsequent step sizes are increased by a user-specified value (normally 2).

Once analysis is complete, the results are outputted and displayed in step 208. For static pushover or dynamic time history ultimate capacity analyses of large structures, it is time consuming to view, interpret and digest the voluminous results produced. To ease the analyst's work, three options in the present invention are provided.

Figure 7:
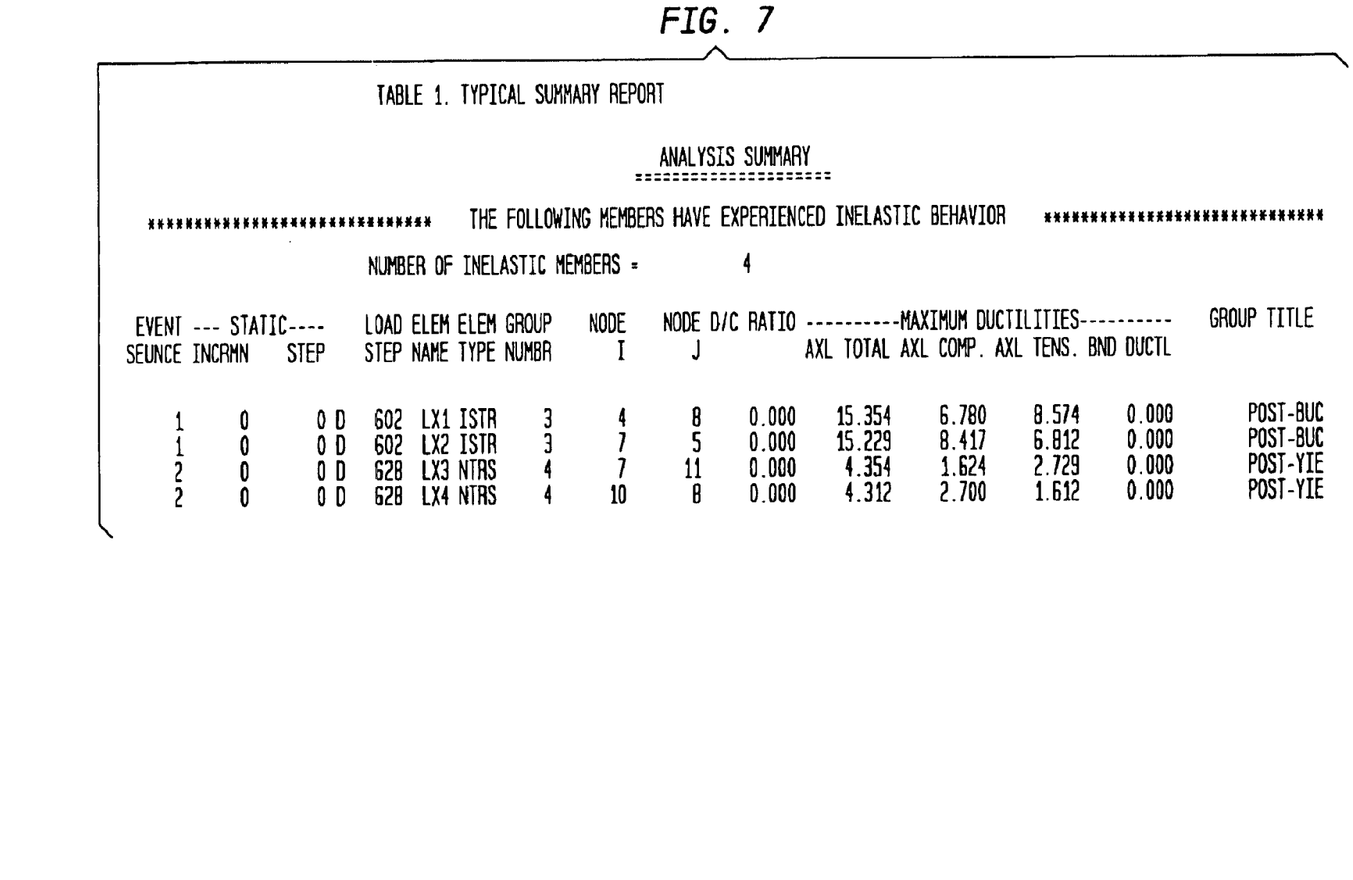
FIG. 7 is an exemplary summary of an inelastic sequence of events for elements of a structure.

The first option is to print a summary of inelastic sequence of events for members, an exemplary summary of which is shown in FIG. 7. The summary includes an event sequence number, static increment number and load step within the increment when the member becomes inelastic, the total load step or dynamic time step, member name experiencing the inelastic behavior, member type, member group number, nodes I and J, D/C ratio, and group title. Each nonlinear member's maximum ductilities are also available in terms of resultant bending, axial tension, axial compression and axial total. First, a list in order of inelastic event sequence is available, followed by the sorted list of members experiencing maximum to minimum damage. Further sorting is available for different member types. Other information may also be available.

Figure 8:
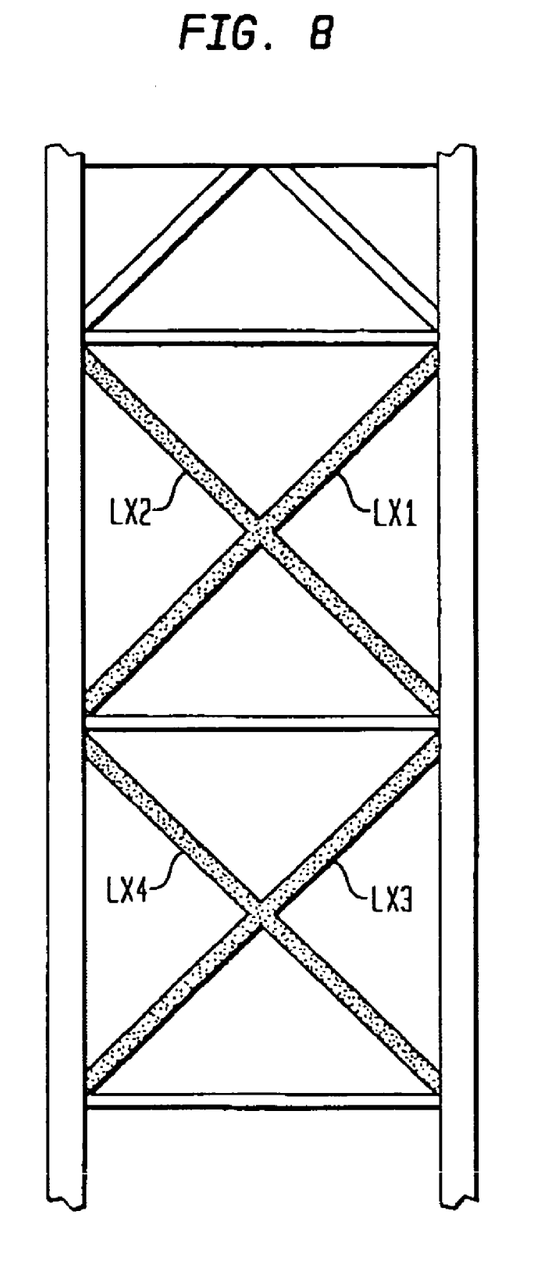
FIG. 8 is an exemplary graphical image of a structure depicting different levels of damage for different members of the structure.

A second option is to generate one or more of at least two forms of graphical output: (a) a color-coded picture of the structure depicting all damaged members from maximum to minimum (a gray scale version of the color-coded picture is shown in FIG. 8); and (b) a color-coded animation of the structure response. The color or the gray scale codes the damage in the braces summarized in FIG. 7. The upper panel braces LX1 and LX2 have maximum axial ductilities of approximately 15 and are shown in dark shade (red in actual application). The lower panel braces LX3 and LX4 are in light shade (blue in actual application) since their maximum ductilities are approximately 4.0.

The present invention provides a mechanism to quantify local, regional and global damage and maps these quantities to Building and Other Code Requirements. As an example, for a high-rise building subjected to a earthquake time history, the user needs to specify the following information only; (a) number of stories in the building where damage is to be monitored; and (b) the nodes at each story which are used to calculate average story motions and displacements. With this information, the present invention automatically calculates global damage measure, regional damage measure and local damage measure. Global damage measure is defined in terms of global displacement ductility. Regional and local damage is defined in terms of inter-story drifts, inter-story shears, number of damaged members, their maximum and cumulative ductilities, and their number of equivalent full plastic cycles. Other measures may be included. The methods used to calculate these quantities are widely known and available in public literature, standard text books.

For risk assessment, the analysis step 206 is repeated for multiple load conditions. For example, to perform a seismic risk assessment of high-rise building, the building is analyzed for a series of seismic loads representing different earthquake intensities. The selection of earthquakes and the analyses can be extremely time consuming, cumbersome and complex. The present invention simplifies the process. A single input data stream can be utilized to perform multiple analyses using a single set of ground motions. Each execution run scales the single set of ground motions by user defined scale factors. Usually the first scale factor is selected such that damage initiates in the structure when subjected to this scaled ground motion. Alternately, the user may specify different target spectral accelerations. Again, the first target spectral acceleration is selected such that damage initiates in the structure when subjected to this scaled ground motion. Scale factors for ground motions are automatically calculated to match the user specified target spectral accelerations.

Figure 9:
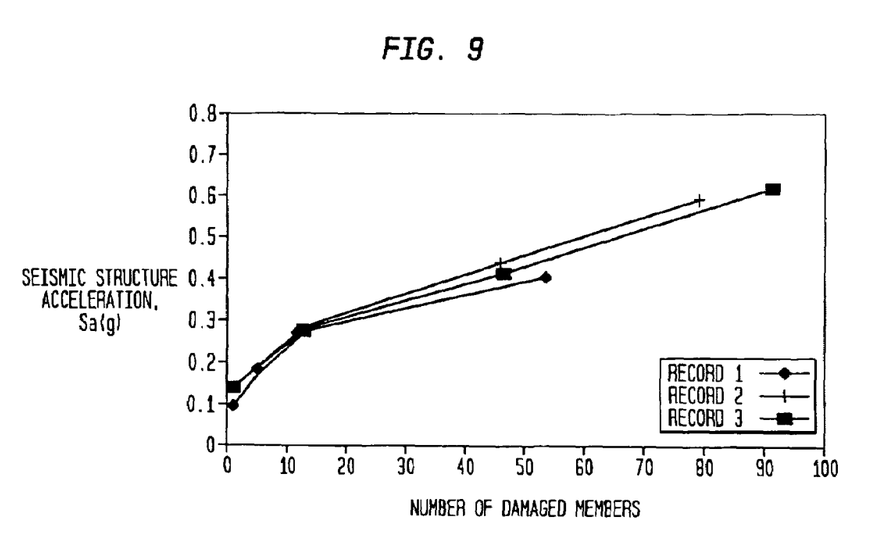
FIG. 9 is a plot of the number of damaged members as a function of a spectral acceleration from three different exemplary earthquake records.

Finally, all the analyses results are automatically tabulated and graphically output with different options. An exemplary table/graph is shown in FIG. 9. The y-axis shows the seismic spectral acceleration and the x-axis is the number of damaged members from three different earthquake records (record 1, record 2 and record 3). Other parameters can be mapped in to generate similar graphs. As an example, the spectral acceleration could be mapped into a mean return period from a probabilistic seismic hazard analysis. The mean return period can be translated into probability (i.e., the reciprocal of mean return period is the probability of occurrence). Hence y-axis could now be probability of occurrence. Similar procedures could be followed for other damage measures.

Figure 10:
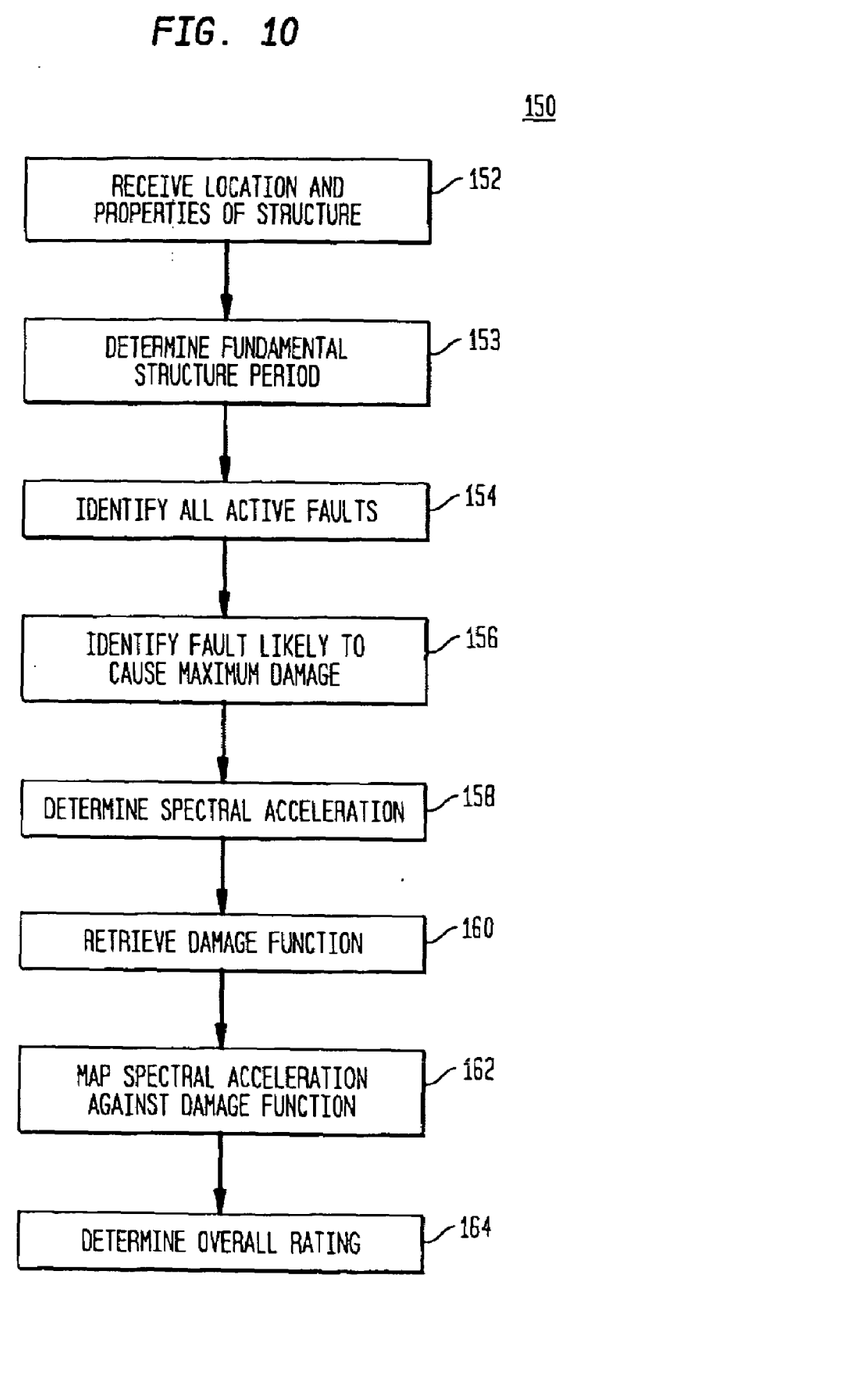
FIG. 10 is a flow diagram of a method of rating a structure for risk assessment.

In another embodiment of the present invention, the system 100 also provides a structure rating routine 150 for individuals, financial institutions, insurance companies, real estate brokerage firms, and other entities as shown in FIG. 10. The financial institutions can use the rating system to assess their lending portfolio and risks. Similarly insurance companies can use the data to assess risks and establish appropriate premiums. Other institutions such as the real-estate brokerage firms could use it as a marketing tool. The end-user would access the database in the present invention for rating systems. Such database is created and based on engineering and scientific principles.

In operation, an end user access the system 100 through the Internet, and sets up an account, or chooses to pay by credit card, or through their checking account.

The end-user can use the system 100 in either a pre-processor mode or execution mode. In the pre-processor mode, the user submits the data for checking and validity and obtains an approximate cost for the proposed analysis. This pre-processor mode service is free. Once the user is satisfied with the data accuracy and accepts the cost, the data is submitted for execution. In the embodiment shown, all processing occurs within the in-house server machines.

Once the execution is finished, the user may be notified by e-mail to download the print-out of analyses results and associated information in graphical form. These may be pictures of their structure models, pictures of their structure depicting color-coded damaged areas, and real-time animation of their structure response. Any support is provided through a 1-900-number with costs billed through the telephone company.

In step 152, the routine 150 receives from the user the location and properties information of the structure to be rated. For example, for a house in California, the user would supply the location address, the type of structure (e.g., one, two-story wood frame), when it was built, information about any upgrades and the like. In step 153, using this information, the structure's fundamental period is determined by either utilizing Building Code equations or other well-known methods. The reason for obtaining the structure's fundamental period will be discussed later herein in detail.

In step 154, the routine identifies all active faults around the structure to be rated. In step 156, the routine identifies the fault(s) that likely cause the most damage to the structure with the earthquake magnitudes the identified fault(s) can generate and their probability. This information can be obtained from a seismic hazard analysis or publicly available databases.

In step 158, spectral accelerations for the structure from the identified fault in step 156 are obtained. The seismic hazard analysis and the structure fundamental period(s) provide the information on spectral accelerations for the structure under consideration.

Figure 11:
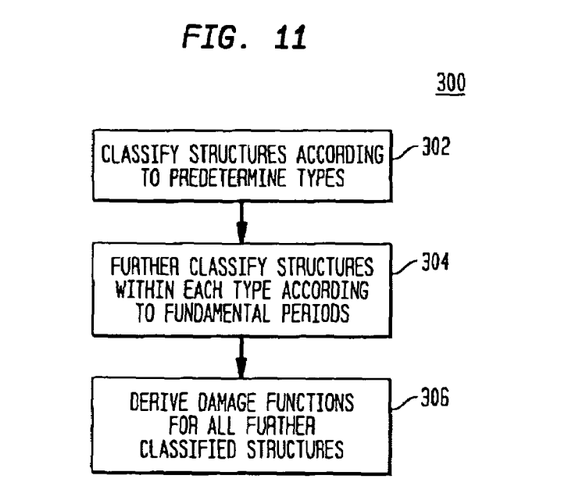
FIG. 11 is a flow diagram of a method determining damage functions.

Referring to FIG. 11, a damage function routine 300 will now be discussed. In step 302, the routine 300 classifies all structures according to a predetermined structure types such as building code guidelines, FEMA guidelines or any rational means. In step 304, further classification (sub-classification) of the structures within each classified type is done based on fundamental structure periods. This way, all structures within a classified structure type whose fundamental structure period falls within a predetermined range are considered to be similar structures for the purpose of structure analysis. This novel feature of sub-classifying structure types based on fundamental structure periods allows (a) creation of fewer damage functions that are applicable to a larger population and (b) a rational basis for interpolation/ extrapolation of damage functions between periods. Thus if there are two masonary buildings, one 10 foot high and the other 20 foot high, and the layout of these buildings is such that their fundamental vibration periods are the same or very close to each other within a very small range, then only one building needs to be analyzed for creation of damage functions which can then be applied to both buildings.

In step 306, a damage function for each sub-classified structure is determined in the following way to create a database of damage functions. The damage functions database is created by performing nonlinear analyses of typical structures built under typical building codes and typical building materials.

As an example, nonlinear models of houses built in different seismic zones, different soil conditions, and under different building codes are analyzed using nonlinear time history analyses. The house models are subjected to different earthquake intensities to establish what earthquake levels initiate damage, and what earthquake levels cause structural failure. For this purpose, preferably several sets of earthquake ground motion records are selected. Each set of ground motion records is appropriately scaled to simulate conditions from damage initiation to failure. In addition, the locations and propagation of damage is identified. The damage is quantified into three categories: (a) global damage; (b) regional damage and (c) local damage. A typical damage function is shown in FIG. 12.

Figure 12:
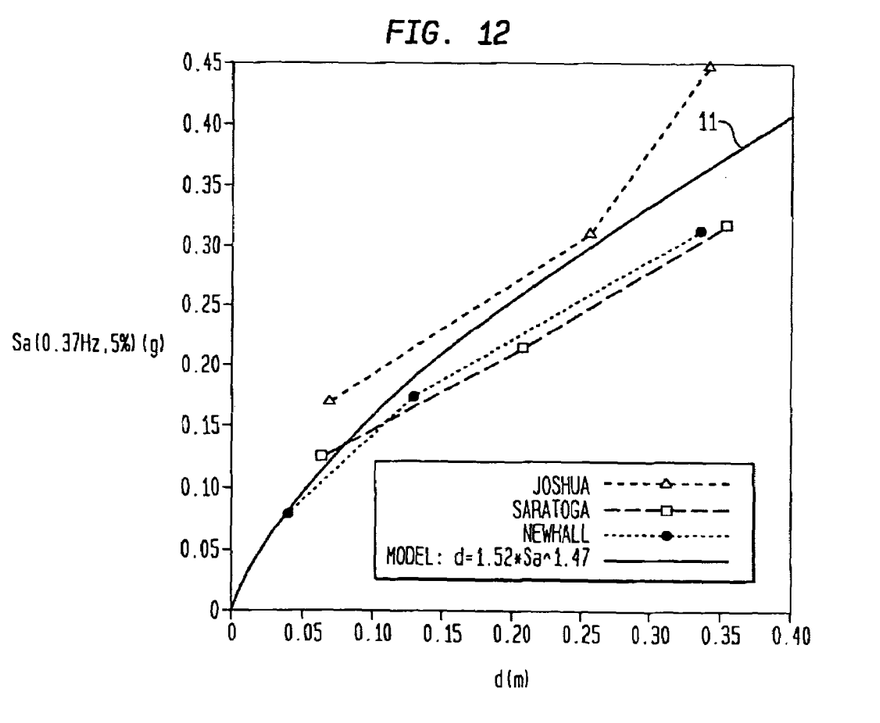
FIG. 12 is a chart illustrating a damage function in one embodiment.

In FIG. 12, the structure type analyzed is a deck-isolated steel offshore jacket structure which was analyzed for three earthquake records: Joshua, Saratoga and Newhall. Each record was scaled by three values. A total of nine nonlinear dynamic time history analyses were performed. The damage measure monitored here was the relative displacements between the deck and jacket top. Damage functions for each of the earthquake records is shown as identified by the earthquake record name. The curve 11 is the mean structure damage curve obtained by performing a regression analysis on damage functions from each record. While any number of ground motions may be used to calculate the mean damage curves (from 1 to 5 or more), three sets of ground motions are sufficient to generate mean structure damage curves since the uncertainty associated with the ground motion is far greater than the uncertainty in the response calculations.

If necessary, uncertainty in the response can be quantified by varying key input parameters (e.g., yield stress) and repeating the nonlinear analyses for each earthquake record. This process results in several damage curves for each earthquake record. A regression analysis can be performed to obtain a mean damage curve for the particular earthquake record. Finally, as before, regression analysis on the mean damage curves for each record provides the mean damage function accounting for the uncertainty in the response.

Non-structural damage functions are mapped to structural damage functions. As an example, if the inter-story drift in the structural damage function exceeds a threshold value, non-structural damage is initiated (i.e., glass breaking, water/gas pipes shearing, etc.). Similar damage functions (structural and non-structural) are created for each structure type and material type in step 306.

Referring back to FIG. 10, step 160 retrieves from the damage functions database one damage function of the sub-classified structure that most closely corresponds to the structure to be rated based on its fundamental structure period and material properties.

Damage to the property may be structural damage or non-structural damage. Structural damage is obtained in step 162 by mapping the spectral acceleration obtained in step 158 against the damage function retrieved in step 160.

In step 164, the routine determines an overall rating for the property from a scale of 1 to 10. The rating considers structural damage (global, regional, local) and non-structural damage information in conjunction with the hazard under consideration (e.g., earthquake). Financial and other information may also be considered.

The structure rating routine 150 described above is applicable to any hazard which can be probabilistically quantified and can be applied to hurricane loadings, waves/wind/ current for offshore structures, and the like. Similarly, damage function routine 300 is applicable to other hazards (e.g. hurricanes, waves, wind, etc.).

From the foregoing, it will be appreciated that, although specific embodiments of the invention have been described herein for purposes of illustration, various modifications may be made without deviating from the spirit and scope of the invention. For example, while the embodiment disclosed illustrates the present invention in an Internet environment, persons of ordinary skill in the art will appreciate that the system can be implemented in any computer network environment including the Intranet, LAN, WAN or the like. Accordingly, the present invention is not limited except as by the appended claims.

What is claimed is:

1. A computer-implemented method for analyzing a structure comprising:
   receiving linear elastic input data of a structure;
   automatically determining non-linear input data based on the received linear elastic input data;
   analyzing the determined non-linear input data through a non-linear analysis technique; and
   outputting the result of analysis including at least global damage measure including one or more of a global displacement ductility and number of damaged members, regional damage measure including one or more of inter-story drifts, inter-story shears, number of damaged members in a region, and identification of damaged members; and local damage measure including one or more of maximum member ductilities, cumulative member ductilities and number of cycle reversals,
   wherein the step of analyzing includes at least two or more of:
   using a minimization technique to minimize the storage requirements of a global stiffness matrix and local stiffness matrix;
   using a numerical solution technique that requires only one copy of the global stiffness matrix;
   reformulating and reducing only a portion of a global stiffness matrix that changes due to change in member state;
   using a sufficiently higher order integration method to increase the step size thereby reducing the number of steps required for analysis.

2. The method according to claim 1, further comprising determining a static load pushover profile for use in a static load pushover analysis.

3. The method according to claim 1 wherein the step of automatically determining non-linear input data includes automatically determining the envelope behavior, degradation behavior, and failure behavior of members of the structure based on previously determined models of the members and the received linear elastic input data.

4. The method according to claim 3 wherein at least a part of the data for the previously determined models is based on experimental or empirical data, and each model is stored as a plurality of data points, a mathematical representation, or both.

5. The method according to claim 1, further comprising displaying a summary of inelastic sequence of events for damaged members of the structure.

6. The method according to claim 5 wherein the summary includes global, regional, and local damage measures.

7. The method according to claim 1 wherein the step of outputting includes outputting a color-coded image of the structure showing different levels of damage to the members of the structure.

8. The method according to claim 1, further comprising:
repeating the analyzing step for each of a plurality of intensities or probabilities of a preselected catastrophic load; and
displaying the number of damage measures as a function of the intensities or probabilities of the preselected catastrophic load.

9. The method according to claim 8, further comprising using the damage measures to assess monetary losses or to make a financial or mitigation decision.

10. The method of claim 1, further including:
classifying a plurality of structures according to predetermined structure types;
sub-classifying the structures within each classified structure type by fundamental structure periods;
determining damage functions for the sub-classified structures; and
storing the determined damage functions.

11. The method according to claim 9, further comprising determining non-structural damage functions corresponding to the structural damage functions.

12. The method according to claim 9 wherein the step of classifying includes classifying the plurality of structures according to either FEMA guidelines or building code guidelines.

13. The method according to claim 9 wherein the step of sub-classifying includes sub-classifying as similar structures all structures within a classified structure type whose fundamental structure period falls within a predetermined range.

14. The method according to claim 9, further comprising:
receiving location and other data of a first structure;
identifying among the plurality of classified structures one classified structure that corresponds to the first structure; and
retrieving the stored damage function of a sub-classified structure that corresponds to the identified structure for analysis of the first structure.

15. The method according to claim 9, further comprising:
determining a fault that likely causes damage to the first structure;
determining at least one spectral acceleration of the determined fault line to the structure; and
determining a damage measure for the determined spectral acceleration from the retrieved damage function.

16. The method according to claim 9 wherein the step of determining damage functions includes:
determining damage functions of a plurality of previous disasters; and
calculating a mean damage function from the determined damage functions by regression.

* * * * *